United States Patent [19]

Paul

[11] Patent Number: 4,845,941

[45] Date of Patent: Jul. 11, 1989

[54] GAS TURBINE ENGINE OPERATING PROCESS

[76] Inventor: Marius A. Paul, 1100 E. Orangethorpe Ave., Ste. 140, Anaheim, Calif. 92601

[21] Appl. No.: 127,916

[22] Filed: Dec. 2, 1987

Related U.S. Application Data

[63] Continuation-in-part of Ser. No. 928,733, Nov. 7, 1986, abandoned, and Ser. No. 764,424, Aug. 9, 1985, abandoned.

[51] Int. Cl.$^4$ .............................. F02C 3/14; F02C 7/12
[52] U.S. Cl. .................................. 60/39.06; 60/39.36; 60/735; 60/744
[58] Field of Search ................... 60/39.06, 39.36, 730, 60/735, 736, 744, 745, 39.75; 415/114, 115; 416/96 R, 97 R

[56] References Cited

U.S. PATENT DOCUMENTS

| | | | |
|---|---|---|---|
| 2,595,505 | 5/1952 | Bachle | 60/39.36 |
| 2,636,344 | 4/1953 | Heath | 60/735 |
| 2,647,368 | 8/1953 | Triebnigg et al. | 60/39.54 |
| 2,783,613 | 3/1957 | Zborowski | 60/736 |
| 2,924,939 | 2/1960 | Leibach | 60/39.36 |
| 2,981,066 | 4/1961 | Johnson | 60/735 |
| 3,287,905 | 11/1966 | Bayard | 60/39.36 |
| 3,446,481 | 5/1969 | Kydd | 253/77 |
| 3,600,890 | 8/1924 | White | 60/39.66 |
| 4,118,145 | 10/1978 | Stahl | 416/96 R |

FOREIGN PATENT DOCUMENTS

1231959 1/1967 Fed. Rep. of Germany .

Primary Examiner—Louis J. Casaregola
Attorney, Agent, or Firm—Bielen and Peterson

[57] ABSTRACT

The process of increasing the efficiency and output of a gas-turbine having blades in a combustion chamber which includes cooling the gas-turbine blades with a liquid-fuel and mixing the fuel used for cooling with air in the combustion chamber and burning the mixture and driving the turbine by the exhaust from the combustion chamber. Preferably the fuel is a liquid-gas such as hydrogen. The turbine may be cooled by injecting liquid-fuel onto its disk to provide a film coating which is centrifuged around the blades whereby the liquid will cool both the interior and exterior of the blades and the absorbed heat is introduced into the combustion chamber. The combustion chamber includes a plurality of air inlets. The turbine drives a compressor and the compressor and the air inlet may be cooled with the liquid-fuel, which may be cryogenically cooled. An improved jet engine which is convertible from a turbo to a ramjet is provided.

12 Claims, 6 Drawing Sheets

GAS TURBINE ENGINE OPERATING PROCESS

BACKGROUND OF THE INVENTION

This application is a continuation-in-part of my earlier applications entitled, PROCESS OF INTENSIFICATION OF THE THERMOENERGETICAL CYCLE AND AIR JET PROPULSION ENGINES, Ser. No. 06/928,733, filed: 7 November, 1986 (abandoned) and Ser. No. 06/764,424, filed: 9 Aug., 1985 (abandoned).

This invention relates to various processes which allow the intensification of recuperative thermoenergetical cycles to maximize efficiency of air jet propulsion engines and includes new types of air jet propulsion engines.

The described solutions allow the increase of the gas temperature at the turbine entrance to its stoichiometric level, simultaneously with an increase in the efficiency of the compression process allowing reduction in the number of stages of compression.

The solutions allow the use of non-petroleum fuels in order to extend the capacity of world energy resources.

Actual gas turbines, working in an open cycle and without recovery of the energy of the exhausted gases, depend on the pressure ratio $\pi = p_2/p_1$ and on the value of the temperature of the burnt-gases at the turbine entrance $T_3$ for determining efficiency and power.

If we neglect losses and refer to the ideal thermal cycle the thermal efficiency is dependent on $\pi$, where:

$$\eta\text{th} = 1 - \frac{T_1}{T_2} = 1 - \frac{T_4}{T_3} = \ldots 1 - \frac{1}{\pi^{\frac{K-1}{K}}}$$

and the effective work of the process chiefly dependent on the value $T_3$; where;

$P_1$ = ambient pressure
$P_2$ = compression pressure
$T_1$ = ambient temperature
$T_2$ = compression temperature
$T_3$ = inlet temperature to turbine
$T_4$ = final expansive temperature
$K = C_p/C_v$ specific heat ratio It may be concluded that efforts in engine research are directed toward increasing the two parameters $\pi$ and $T_3$ to improve engine efficiency.

If we take into account the efficiency of the components utilized in this process as: the compressor, the turbine, and the combustion chamber, and include mechanical losses, we obtain an effective efficiency:

$$\eta = (\eta_c \times \eta_t \times \eta_{comb} \times \eta_m) \times \eta_{th}$$

where:
$\eta_e$ = effective efficiency
$\eta_c$ = compressor efficiency
$\eta_t$ = turbine efficiency
$\eta_{comb}$ = combustion chamber efficiency
$\eta_m$ = mechanical efficiency
$\eta_{th}$ = thermal efficiency and the real mechanical work:

$$W_e = W_n \times (\eta_c \cdot \eta_t \cdot \eta_{comb} \cdot \eta_m)$$

where:
$W_e$ = real work
$W_n$ = theoretical work

The conclusion remains when we particularize the component efficiencies where: $\eta_c = 0.84$; $\eta_t = 0.88$; $\eta_{comb} = 0.97$; $\eta_m = 0.99$.

The two parameters $\pi$ and $T_3$ are related in optimizing engine efficiency with typical efficiency values for each pair $\pi$ and $T_3$ being:

| Efficiency % | 19 | 24 | 28 | 30 | 32 | 36 |
|---|---|---|---|---|---|---|
| T° C. | 600 | 700 | 800 | 900 | 1000 | 1200 |
| P2/P1 | 8–9 | 12–14 | 15–17 | 16–18 | 18–21 | 27 |

Optimal compression ratios would be at values corresponding to $\pi = 45$ to 65 and in the future even higher, reaching the pressure limit produced by stoichiometric combustion with gas temperatures of 2000°–2200° C. However, at these levels, the technological difficulties in engine construction cannot easily be resolved with present technical means.

The increase in the turbine inlet temperature to 1300° C. with air cooling of the blades constitutes a practical limit of actual gas turbine evolution. The latest research regarding the manufacture of turbine blades of monocrystal alloy adds 100° C., thereby reaching a value of 1400° C. However, utilization of a part of the compressed air for blade cooling, diminishes the gas turbine efficiency by the energy carried away in the cooling air and by the non participation of the cooling air in the combustion process.

For that reason, at present, it is desirable to reduce the quantity of lost cooling air and to find other ways of withstanding the high gas temperature necessary for improved efficiency.

The introduction of ceramic materials for engine parts has shown promise. However, the difficulties characteristic in these materials, limits their application in meeting high temperatures in a turbine engine.

The cooling of the blades of a gas turbine by fluids in a closed circuit creates special problems and results in an increase in level of complexity of gas turbines over those having the air cooling.

In parallel with the mentioned temperature difficulties, the increase of compression ratios over 25–27, leads to great dynamic structural problems for both turbines and compressors. An increase in the number of compressor stages also creates higher levels of complexity. This leads to prohibitive rises in gas turbine prices, and, respectively, to a decrease in the ability of these thermal machines to compete.

The low efficiency of jet propulsion engines, associated with the massive power, achieved or able to be achieved by these engines makes a gigantic petroleum consumer of the military and commercial air force.

All the above elements unfavorably affect the position of the gas turbine in the world energy context.

SUMMARY OF THE INVENTION

This invention resolves many of the above mentioned difficulties by the fact that:

It assures the cooling of the blades of the gas turbine and all of the other hot surfaces by fluids and air in an open recuperative circuit, allowing the burnt gases to pass to the turbine at the stoichiometric combustion temperature for maximum thermodynamic efficiency.

The cooling fluids together with air form rich mixtures with great convective capacity in the blade cooling system. The cooling fluids may be constituted of petroleum fuels, water, or liquified gases such as liquid hydrogen, liquid methane, or liquid air, etc.

The temperature of the interior surfaces, cooled by the vaporizing mixture of air and liquid is maintained at a level that avoids cracking of the hydrocarbons. In the case of monocomponent liquids (liquid hydrogen, etc.) the temperature of the walls is indifferent, except for preserving the structural integrity of the components.

Some quantity of the preferred cooling fluid (liquid fuel, etc.) is bilaterally injected on the turbine disk, where a film coating is produced. The film coating is centrifuged toward the turbine blade base, from where the coolant, together with the cooling air enters the interior channels of the blades, producing a convective evaporating cooling. The final rich mixture of air and fuel is centrifugally and tangentially expelled into a zone of turbulent mixing in the combustion chamber, where the formation of the primary combustion gas mixture takes place.

Another quantity of the preferred cooling fluid (fuel or liquified gases) is injected in the interior of the stator blades, then evaporated, mixed with cooling air and turbulently introduced into the combustion chamber, where it is combined with a mixture of air and fuel delivered by the turbine rotor.

The rich mixture, which has cooled the turbine blades, when introduced in the annular combustion chamber located around the turbine, inherently recovers the absorbed heat in the air used for cooling.

The combustion chamber, located around the periphery of the turbine forms a turbo recuperative space. A rich mixture, made up of the combustible cooling fluids, vaporized and mixed with air, is expelled from the tips of the turbine blades into the combustion chamber with the peripheral speed of the turbine rotor which travel at speeds around 400 m/sec.

The combustion chamber for the ga turbine is also supplied with fuel from a direct source, individual injectors, in addition to the mixture of air and fuel vapor, which cooled the turbine.

The high velocity injection of the cooling mixture into the combustion chamber assures a high level of peripheral turbulence, allowing mixture of maximal quality to be formed for stoichiometric combustion.

The recirculation of the cooling air into the combustion chamber has a recuperative effect, and the integral utilization of the air for combustion eliminates the inefficiencies in using large quantities of compressed air for blade cooling.

In certain preferred embodiments, air compression takes place in a counter-rotary compressor driven by a counter-rotary gas turbine. The blading of the compressor is arranged to effect compression both axially and radially to the common axis of rotation of the compressor and turbine. The compression process generates the compressed air for both the described cooling and combustion.

The process of air compression in the compressor, in the case of a cryogenically supplied gas turbine, is helped by a preliminary cooling of the air at the compressor inlet and by a continuous and parallel cooling of the air in the compressor. This leads to a process of isothermal compression starting from levels of initial temperature less than the environment temperature.

The cooling in advance of the air admission and the cooling of the compressed air in the compressor is accomplished by cryogenic liquids (liquid hydrogen, liquid methane, or liquid air). For example, hydrogen at minus 252° C., will recuperatively absorb the heat of the admitted air and the heat of the compressed air and transfer it to the engine cycle as a surplus of internal energy (additional calorific power).

The cooling in advance of the air admission absorbs the heat of the air originated in the environment and transfers it to the engine cycle, conferring an increased efficiency. Under special power conditions with exhaust cooling, a thermal cycle with gases exhausted at the initial temperature of the environment can be devised.

The recuperative utilization of the heat, transferred to the hot surfaces of the chambers of primary combustion and to the chamber of after combustion, generates a source of active fluid (vaporized liquid hydrogen, vaporized liquid methane, etc.) In one embodiment the active fluid is superheated and is allowed to vaporize and drive a mini gas turbine which produces the energy necessary for fuel pumps or other uses.

In another convertible turbine-ramjet embodiment, the recuperative cooling system is associated with a double air flow system. The first, a central flow, passes through the compressor and the second, a concentric flow, constitutes a bypass flow of variable section, which peripherally rounds the compressor. The assembly of the two air flows is unified in a controlled mix zone preceeding the primary combustion chamber. The compressed air bypass is concentric to the primary combustion chamber and directs the compressed air flow through an outer blading section of the turbine. This outer air flow is unified in zone of an after combustion chamber with the mixture of burnt and unburnt gases produced in the primary chamber, which have passed through an interior blade section of the turbine.

At high supersonic speeds, when the dynamic compression of the air becomes important, the bypass air flow is made available by a reduction of the section of the central air inlet and by an increase of the section of the peripheral air inlet, the engine working as a ramjet (stato-reactor), thus providing a convertible engine.

In a last embodiment of the invention, the recuperative cooling system is used in ramjet and is associated with a multistaged battery of ejectors, which, receiving the energy of the recuperative fluid (hydrogen, methane, vaporized and superheated liquid), initiates the intake, mixing and compression of air, which participates in the process of combustion and propulsion The successive mini combustion chambers constitute in ensemble an unlimited thermodynamic cascade, whose energy is successively utilized for the internal compression of the air and of the gases for the final propulsion.

On initial ignition, the chamber of primary excitation in the ramjet can be supplied with air and burnt gases from an auxiliary micro-turbine. Alternately, the chamber can be supplied with solid fuel or oxygen and fuel in a rocket regime to initiate the thermal energy needed to superheat the fuel for operation of the ejector services.

These and other features will become apparent from a consideration of the detailed description of the preferred embodiments.

DESCRIPTION OF THE PREFERRED EMBODIMENTS

Figure 1:
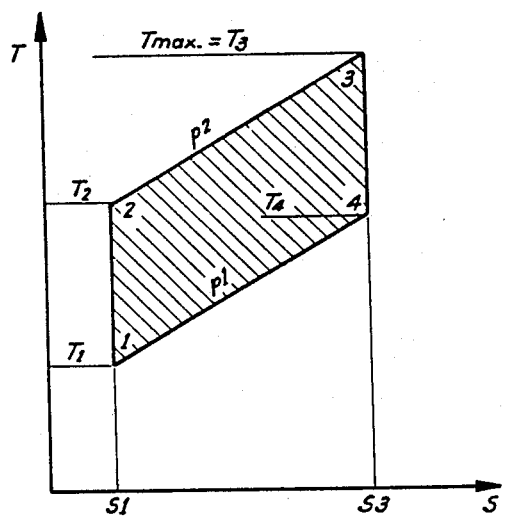
FIG. 1 is a diagram showing an ideal thermal cycle gas turbine.

Referring to FIG. 1 an ideal temperature-entropy diagram is shown for a simple open cycle gas turbine. Air at atmospheric conditions at temperature $T_1$ and pressure $p_1$, enters a compressor at point 1, where it is compressed adiabatically and reversibly to point 2, where the pressure and temperature are $p_2$ and $T_2$. From point 2 the air is mixed with fuel and combusted and constant pressure raising the temperature to $T_3$ at point 3. The combusted gases are expanded in a turbine to the atmospheric pressure with exhaust temperature $T_4$ at point 4.

Figure 2:
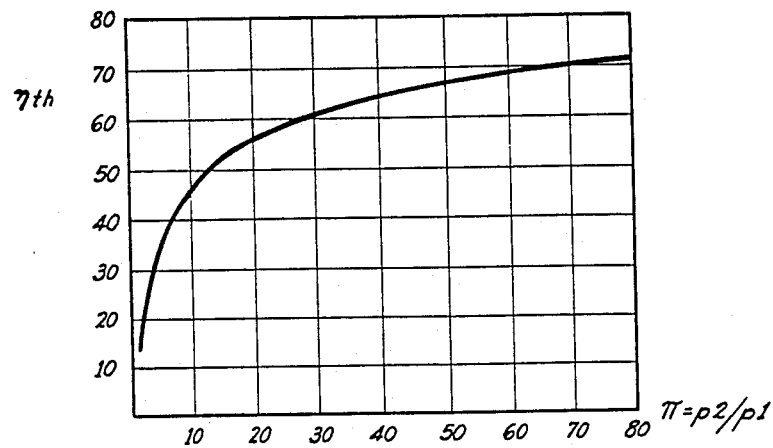
FIG. 2 is a diagram showing variation of the thermal efficiency, depending on the pressure ratio.
Figure 3:
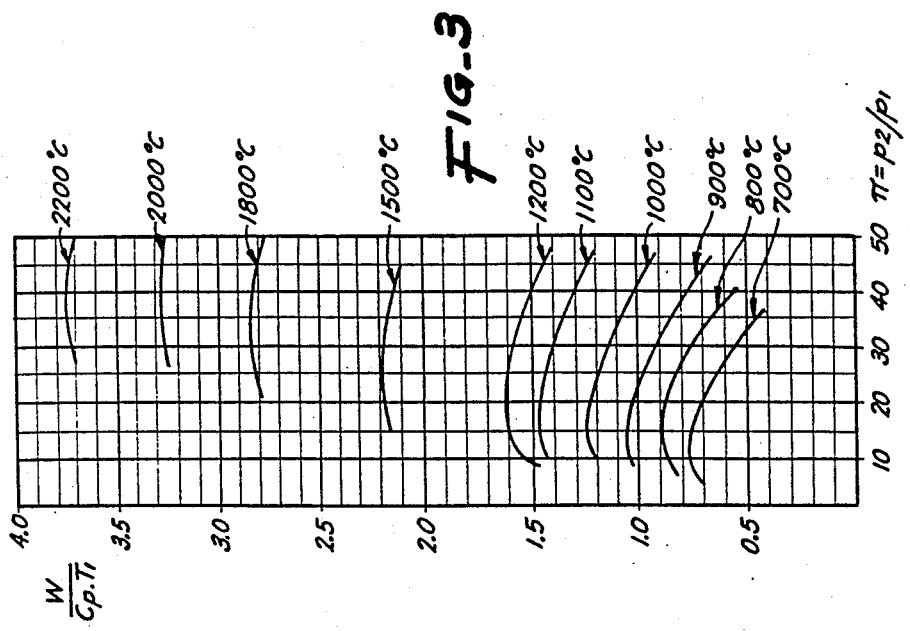
FIG. 3 is a diagram showing a variation of the effective efficiency depending on the turbine inlet temperature and on the pressure ratio.
Figure 4:
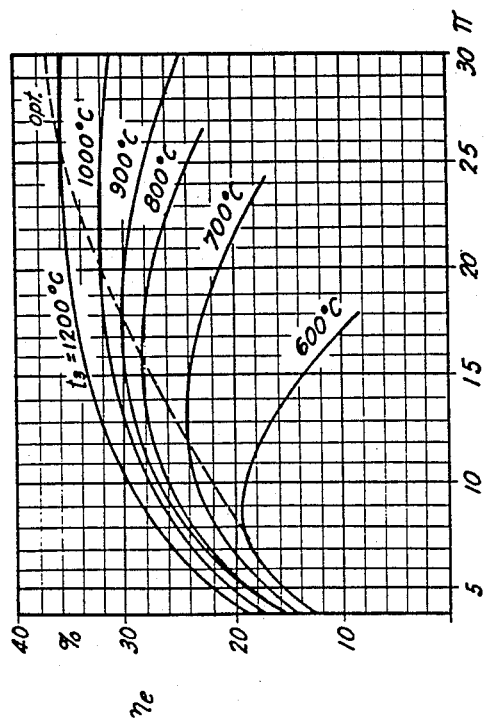
FIG. 4 is a diagram showing a variation of the effective efficiency depending on the turbine inlet temperature and on the pressure ratio.

In FIG. 2 the theoretical thermal efficiencies $\eta_{th}$ of a turbine are graphed with respect to pressure ratios $\pi$, which is $p_2/p_1$. Variations in the relative mechanical specific work or work obtainable, depending on the temperature $T_3$ and pressure ratio $\pi$ are shown in FIG. 3. Similarly, the typical effective overall efficiency of the turbine cycle is shown for variations in pressure ratio $\pi$ and temperature T3 in FIG. 4.

From the standpoint of effective work and overall efficiency it can be seen that maximizing $T_3$ and the pressure ratio will maximize the work output and efficiency of the gas turbine. The processes disclosed herein are directed to such thermoenergetical maximization for operational gas turbines and include intercooling and regeneration techniques to modify the ideal cycle diagram of FIG. 1, as shown in the temperature-entropy of FIG. 7, to recover some of the energy normally lost in the ideal cycle.

FIGS. 1-4 provide the thermodynamic background for evaluating the parameters hereinbefore discussed for design of an improved performance engine. In order to achieve the efficiencies available to high temperature combustion, a cooling system that not only maintains systems components within acceptable thermal limits must be devised, but the energy absorbed by the cooling system must be effectively returned to the thermal cycle.

Figure 5:
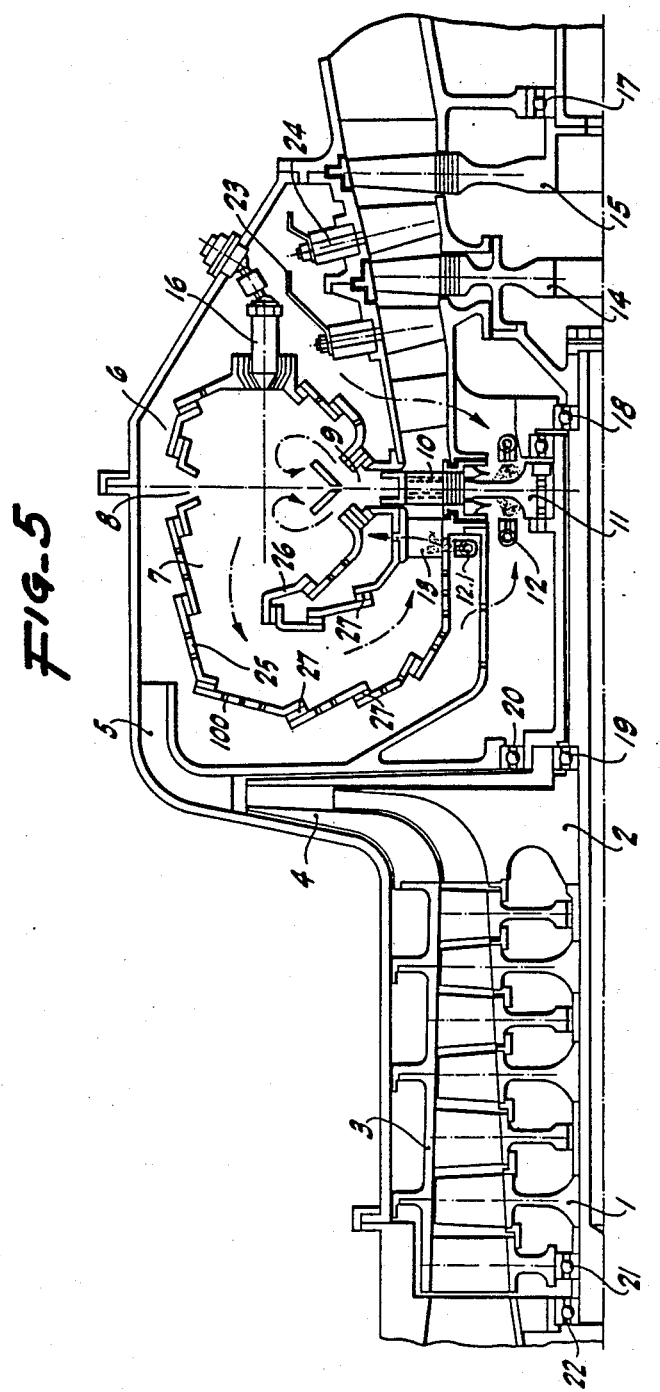
FIG. 5 is an axial half section of a primary turbine embodiment of the engine with recuperative cooling.

A turbo engine, according to this invention shown in FIG. 5 is made up of a gas turbine system with a counter rotating compressor. The compressor has an interior compressor-rotor 1, with axial blades, associated with an interior radial compressor-rotor 2, and has interposed therewith an exterior compressor-rotor 3, with axial blades, and an exterior radial compressor-rotor 4, leading to an air duct 5. The air duct directs the compressed air to the air housing 6, which contains the annular peripheral combustion chamber 7. The combustion chamber 7 is provided with exterior meridian air-ports 8, and with interior meridian air ports 9 for admission of the compressed air.

A turbine rotor 10 is provided with blades with conventional air cooling ducts. The blades are mounted on the turbine disk 11, cooled by liquid injectors 12. The coolant, together with the cooling air enters interior channels (shown in dotted line) in the blades, where a convective evaporative cooling is produced. The mixture of air and fuel vapor is centrifugally and tangentially expelled from the interior channels of the blades into the combustion chamber for final mixing and combustion.

The stator blades 13 are similarly cooled by another quantity of cooling fluid injected into the interior of the stator blades by injectors 12.1. The coolant evaporates and together with the cooling air is introduced into the combustion chamber where it is associated with the mixture of air and fuel from the turbine blades and combusted. The second stage gas turbine rotor 14 actuates the interior axial and radial compressor 1, and the turbine 10 actuates the exterior axial rotor 3 and radial compressor 4. The turbine 15 is the final stage using the energy of the combustion gases. The combustion chamber 7 is provided with the primary fuel injectors 16.

The rotary assembly is supported by the supports with bearings 17, 18, 19, 20, 21, 22. The stator blades of the final turbines 23 and 24 are adjustable for optimizing the speed regime. The walls 25 and 26 of the combustion chamber are completely fabricated with perforated holes 100, which allow an air inlet by perspiration across the whole metal surface of the combustion chamber 7. The chamber 7 includes supplimentary air inlets 27, spacially disposed for assuring a high quality combustion.

The running of the gas turbine, according to the invention and to FIG. 5, is accomplished by counter rotary driving of the interior axial compressor 1 and radial compressor 2, and the exterior axial compressor 3 and radial compressor 4, which pumps the air up through the channel 5 into the air housing 6. The housing 6 contains the annular peripheral combustion chamber 7 which is provided with primary exterior, meridian ports 8, and with primary interior, meridian ports 9 for introduction of air and an air-fuel mixture into the chamber. The walls 25 and 26 of the combustion chamber 7, as noted, are manufactured of perforated sheet material with micro-orifices 100 on the whole surface. The orifices produce an air perspiration, which eliminates the direct contact between the metal walls and the burnt gases, thus isolating the whole flow of the burnt gases during the combustion process.

The combustion process is initiated and controlled by injecting primary fuel through the injectors which starts the gas turbine and continues its working at reduced power. At high power, when the burnt gases surpass 1000°-1200° C., which make necessary the internal blade cooling, the injectors 12 inject cooling liquid-fuel or other liquids which settle down on the turbine disk 11 in the film form, radially penetrate into the interior channels of the blades of the rotor 10, and together with the introduced cooling air, changes to an air-vapor mixture with a high capacity for absorption of heat from the blade walls. The vapor from the cooling liquid and the air that passes through the interior channels of the blades of the turbine 10, are expelled radially and tangentially into the annular, peripheral combustion chamber 7, where occurs a final mixing and complete combustion. The combustion gases are directed to the first stage of the turbine, guided by the stator vanes, which are similarly cooled, and then passed to the subsequent stages. Because the high pressure high temperature first stage of the turbine is provided with the recuperative cooling system, combustion in the combustion chamber can be effected at stoichiometric levels.

Figure 6:
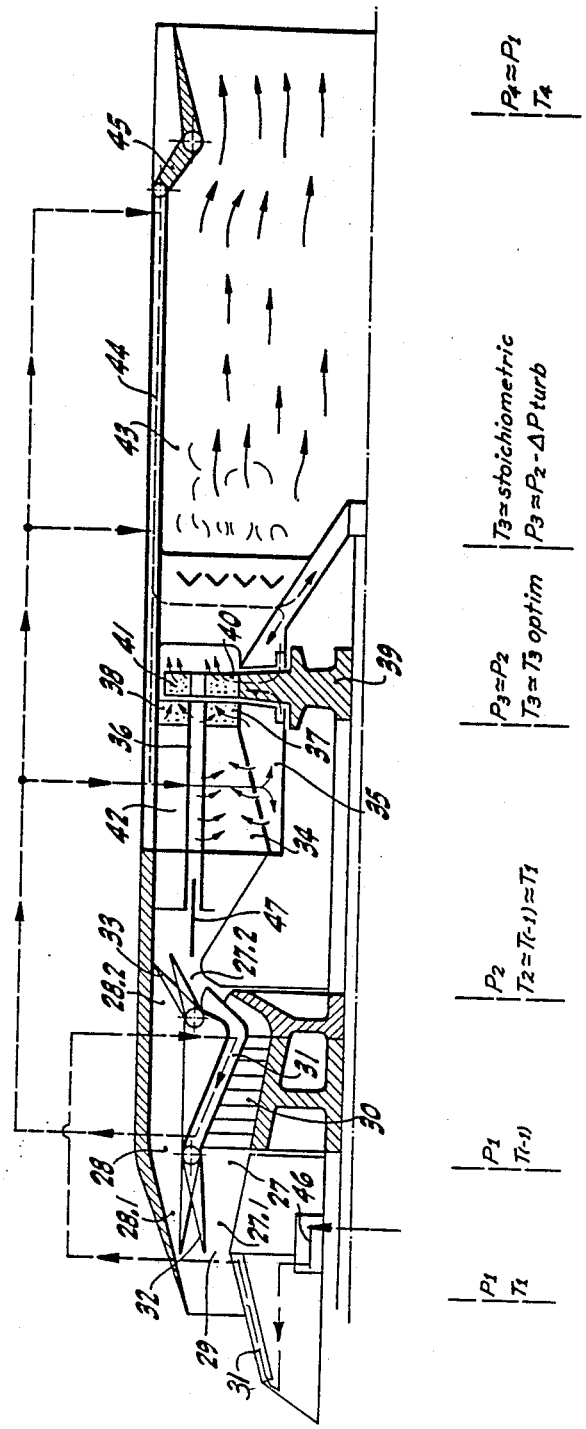
FIG. 6 is an axial half section of a convertible turbine-ramjet embodiment of the engine with recuperative cooling.

Referring now to FIG. 6 the convertible turbo-ramjet engine with recuperative cooling is shown. The engine is made up of a central air flow passage 27 dynamic for compression with variable inlet 27.1 and variable outlet 27.2, a concentric outer air flow passages 28 for ram compression with variable inlet 28.1 and variable outlet 28.2. The central air passage 27 and concentric outer air passage 28 have a combined entry zone 29 for admission and precooling of intake air. A cryogenic cooled compressor 30, provided with a cooling jacket 31, valves 32 for adjusting the air inlet, and valves 33 for the air outlet compresses the air in the central air flow 27.

A primary combustion chamber 34 is provide with fluid cooled walls 35 and 36 through which the cryogenic fuel is atomized into the combustion chamber 34. An inside bladed stator 37 and an outside bladed stator 38 have their blades provided with conventional channels of inner cooling. The axial gas turbine 39 is similarly provided with fluid cooled blades with interior blade sections 40, and concentric, exterior blade sections 41. The blades are provided with channels for inner cooling and ports through which the cooling fluid is discharged into the gas stream. A compressed flow bypass 42 controlled by the sliding divider 47 controls the amount of compressed air entering the bypass channel 42 and the amount of air entering the primary combustion chamber 34. A final combustion chamber 43 is provided with cryogenic cooled walls 44, and a bidimensional, rectangular, adjustable nozzle 45 for regulating reaction. At low speeds when the interior blade sections 40 are driven by the combustion gases from the primary combustion chamber, the exterior blade sections 41 additionally compress the air in the bypass channel before entry into the secondary combustion chamber. At high speeds when the interior blades are not being driven by the combustion gases from the primary combustion chamber, the exterior blade sections are driven by the ram air thus driving the turbine for auxiliary use.

At low speeds the air compression is assured by the compressor 30, with a completely open air inlet 27.1 and a completely open air outlet 27.2. At high speeds the dynamic compression of the air eliminates the necessity of the central compressor. The assembly becomes ram jet by the complete or partial opening of the bypass flow 28.1 and of the outlet 28.2. The turbine remains to deliver limited energy for the fuel pump 46.

The process of admission of the air in the compressor is helped by precooling through the cryogenic fluid (liquid hydrogen, liquid methane) in the cooling jacket 31, which assures the decrease of the initial temperature below the environmental surroundings. The air compression process is also helped by the continuous cooling of the compressor by the cryogenic liquid which assures isothermal compression. The heat, absorbed by the cryogenic fluid during the cooling process for the admitted air, the air compression, the cooling of the combustion chambers and the turbine is reintroduced in the engine cycle as a supplementary calorific addition to the inherent calorific power of the fuel.

By the preliminary cooling and the isothermal compression, a part of the engine cycle develops below the temperature of the environment, constituting a heat pump, which adds a surplus of efficiency to the thermal cycle. This efficiency can be maximized at select power conditions wherein the temperature of the exhausted gases can be lowered to values equal or comparable to those of the environment. This is important to military aircraft which are chased by heat seeking missiles.

The cryogenic liquid in an atomized state or in a vaporized one, is led to the hot surfaces of the interior of the stator blades and to the inside surfaces of the rotor blades and is evacuated by perspiration through ports into the air flow where it is mixed an the mixture burned in the combustion chamber 43.

The running of the recuperative convertible turbo ramjet engine, according to the invention and to FIG. 6, is assured by starting combustion in the primary combustion chamber 34, which produces hot gases and delivers thermal energy to the walls. The liquid hydrogen (or other cryogenic fuel) is pumped by the pump 46 into the precooled air zone 29 passes through the compressor jacket 31 and cools the compressor 30 assuring a process of isothermal air-compression, enters the cooling jacket 44 of the final combustion chamber 43, from where enters the cooling jackets 35 and 36 of the primary combustion chamber 34. A part of the liquid hydrogen is atomized into the inner cooling channels of the stator blades 37 and 38 and another part is atomized on the disk of the gas turbine 39 which penetrates into the inner cooling channels of the blades 40 and 41. By perspiration through ports the liquid hydrogen in the stator blades and the rotor blades is introduced into the central and peripheral air circuits. Another part of the liquid hydrogen that is atomized and vaporized is directly introduced into the primary combustion chamber and is partially burned proportionally with the quantity of air allowed to enter the primary combustion chamber 34, by adjustment of the sliding divider 46. The surplus of unburned hydrogen (unsatisfied with oxygen) passes through the blades of the gas turbine, as a superheated fluid, reaches the final combustion chamber 43, where it is provided with supplemental oxygen and completely burns, producing the useful effect of reaction, controlled by the variable geometry reaction nozzle 45.

At low speeds, the air compression is assured by the compressor 30 with a complete open air inlet 27.1 and a complete open outlet 27.2. At high speeds, the dynamic air compression eliminates the necessity of the central compressor. The assembly changes to a ramjet by the complete of partial opening of the bypass circuit 28.1 and the outlet circuit 28.2. Using the air diversion ducts 28 and 42 and the sliding divider 47, controlled quantities of air are delivered around the compressor and primary combustion chamber to the afterburner. When all air is diverted around both compressor and primary combustion chamber and the engine is operating entirely as a ramjet, the turbine remaining to deliver limited energy for actuating the fuel pump 46.

Figure 7:
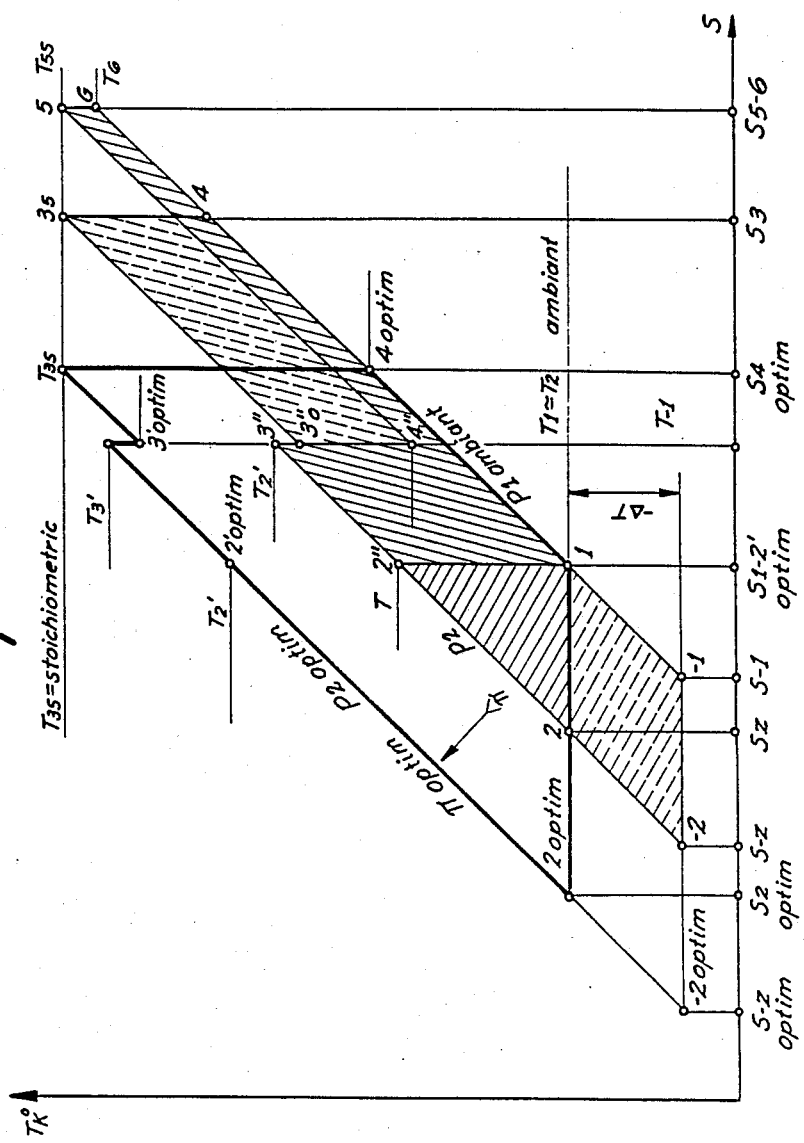
FIG. 7 shows a temperature entropy diagram for the convertible turbine-ramjet engine of FIG. 6.

With reference to FIG. 7 the air admission process in the compressor is helped by precooling through use of a cryogenic fluid (liquid hydrogen, liquid methane, etc.) which assures a decrease in the initial air temperature (FIG. 7, position 1) below the temperature of the environment (FIG. 7, position −1).

The air compression process is further helped by the continuous cooling of the compressor with cryogenic liquid, which assure an isothermal compression (FIG. 7 position −2).

The heat absorbed by the cryogenic fluid during the process of cooling the admitted air, during the process of air compression, and during the cooling of the combustion chambers and the turbine is reintroduced into the engine, cycle as a supplementary thermal addition to the inherent thermal value (chemical) of the fuel.

By precooling and by isothermal compression, a part of the engine cycle develops at temperatures lower than the environmental temperature, constituting a heat pump which adds a surplus of efficiency to the thermal cycle. This efficiency becomes optimal at certain power conditions, in which the temperature of the exhausted gases (isentropic expansion from optimal $T_2'$ to 1) can be lowered to equal or comparable values with those of the environment.

Figure 8:
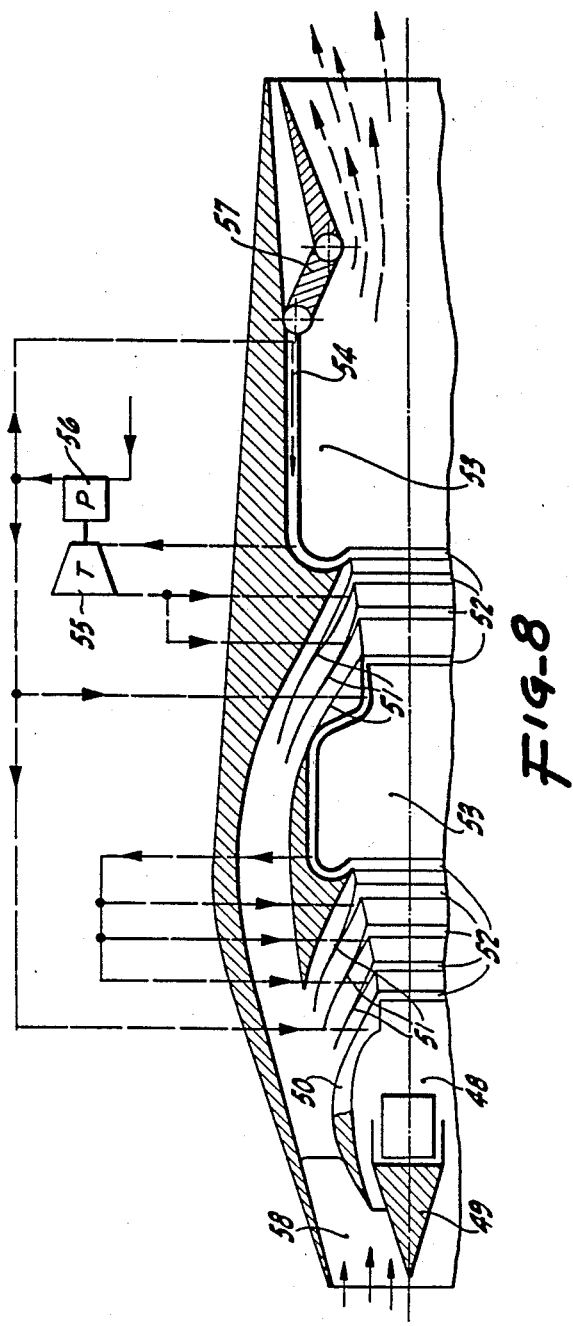
FIG. 8 is an axial half section of a ramjet with a dynamic gas ejector cascade and recuperative cooling system.

The ramjet reaction engine embodiment with recuperative cooling is shown in FIG. 8. The reaction engine has an intake 58 with an internal passage to an excitation chamber the opening to which is controlled by a sliding cone 49. The excitation chamber is blocked from the intake 58 on ignition and open to the intake during high speeds. The intake 58 leads to an annular, primary passage that communicates with a central combustion chamber 53 by a series of passages 51 separated by a battery of ejectors 52 from which fuel is expelled and carried with air into the combustion chamber 53 for combustion and final ejection for reactive propulsion.

The running as a ramjet, according to the invention and to FIG. 8, takes place by igniting fuel in the excitation chamber 48, which is initially closed axially by the sliding cone 49. The central burnt gases, expelled by the excitation chamber, assure the starting of the assembly by the successive air absorption produced by the ejection process. Continuation of the process is assured by the multistaged ejectors 52 which add fuel to the incoming air. Simultaneously, the hydrogen, vaporized and pumped by the pump 56, passes through the interior walls of the recuperative generator 54, reaches a high temperature and pressure and is dynamically expelled by the ejection nozzles 52 into the combustion chamber 53 carrying away the air, mixing and compressing the air and gas mixture, and burning the mixture in the chamber 53, from which the burned gases are expelled as a reactive jet by the nozzle 57.

At high speeds, the cone 49 withdraws, setting free the air access toward the excitation chamber 48, which thus passes from rocket mode to ramjet mode.

The hydrogen vapors, produced by the recuperative generator, drive the micro-turbine 55, which in its turn drives the pump 56 and this pumps the liquid hydrogen in the recuperative journey.

Another excitation variant can be achieved by filling the chamber 48 with solid fuel, which assures the starting period by combustion of the solid fuel to heat the engine and draw in the air. Following the rocket regime, the cone 49 can be withdrawn for ramjet operation at full run load.

Another variant of excitation is carried out by supplying the excitation chamber 48 with air and burnt gases originating in the auxiliary micro-turbine 55.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:
1. The process of increasing the efficiency and output of gas turbine blades and a combustion chamber comprising:
    arranging the combustion chamber, annularly around the turbine blades, cooling the gas turbine blades with a mixture of air and liquid fuel introduced internally in the blades, wherein the liquid fuel vaporizes to form an air-fuel vapor mixture,
    expelling the air-fuel vapor mixture directly from the blades into the annular combustion chamber for turbulent mixing and combustion.
    combusting the air-fuel vapor mixture, recuperatively recovering the extracted thermal energy of vaporization applied to cooling the blades, and
    directing the gases of combustion in the annular combustion chamber at the same turbine blades cooled by the air-fuel vapor mixture to drive the turbine.
2. The process of claim 1 wherein the turbine includes a disk with radially extending blades having internal channels including:
    injecting the liquid fuel on the turbine disk to provide a film coating which is centrifuged toward the blades;
    cooling the interior and the exterior of the blades with the cooling fuel by introducing the cooling fuel from the film coating together with air into the internal channels in the blades where the cooling fuel vaporizes into an air-fuel vapor mixture, and radially and tangentially expelling the air-fuel vapor mixture from the blades directly into the combustion chamber whereby the heat absorbed from th turbine is introduced into the combustion chamber.
3. The process of claim 1 including,
    introducing additional air into the combustion chamber at a plurality of locations around the outer periphery of the chamber.
4. The process of claim 1 including,
    mixing the expelled air-fuel vapor mixture with additional air and fuel supplied to the combustion chamber to achieve stoichiometric combustion.
5. The process of claim 1 wherein the combustion chamber has chamber walls directing exhaust of the combustion to blades of the gas-turbine.
6. The process of claim 5 wherein the chamber walls have perforations for cooling the walls on introduction of air through the perforations.
7. The process of claim 1 wherein the turbine has a cooperating compressor including,
    supplying the air introduced internally in the blades under compression from the compressor.
8. The process of claim 1 wherein the liquid fuel is a gas at ambient temperatures and pressures, the gas being liquified by pressure and/or reduced temperature.
9. The process of claim 1 wherein the liquid fuel is hydrogen.
10. The process of claim 1 wherein the liquid fuel is methane.
11. The process of claim 1 wherein the liquid fuel is methanol.
12. The process of claim 7 wherein the turbine and compressor each have a first rotor, the first rotors being connected together by a central axle and the compressor and turbine each have a second rotor, the second rotors connected together, and including:
    rotating the second rotors counter to the first rotors.

* * * * *